(12) United States Patent
Dean et al.

(10) Patent No.: US 8,612,510 B2
(45) Date of Patent: *Dec. 17, 2013

(54) SYSTEM AND METHOD FOR LARGE-SCALE DATA PROCESSING USING AN APPLICATION-INDEPENDENT FRAMEWORK

(75) Inventors: Jeffrey Dean, Menlo Park, CA (US); Sanjay Ghemawat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 477 days.

This patent is subject to a terminal disclaimer.

(21) Appl. No.: 12/686,292

(22) Filed: Jan. 12, 2010

(65) Prior Publication Data

US 2010/0122065 A1 May 13, 2010

Related U.S. Application Data

(63) Continuation of application No. 10/871,245, filed on Jun. 18, 2004, now Pat. No. 7,756,919.

(51) Int. Cl.
*G06F 15/16* (2006.01)

(52) U.S. Cl.
USPC ........... 709/201; 709/205; 718/101; 718/106; 712/28; 717/149

(58) Field of Classification Search
USPC .................. 709/201–203, 205, 223; 718/106; 718/100–102; 712/28; 717/149
See application file for complete search history.

(56) References Cited

U.S. PATENT DOCUMENTS

| | | | |
|---|---|---|---|
| 3,905,023 A | 9/1975 | Perpiglia | |
| 5,872,904 A | 2/1999 | McMillen et al. | 714/4 |
| 5,872,981 A | 2/1999 | Waddington et al. | |
| 5,937,201 A | 8/1999 | Matsushita et al. | 713/310 |
| 6,041,384 A | 3/2000 | Waddington et al. | |
| 6,088,511 A | 7/2000 | Hardwick | |
| 6,169,989 B1 * | 1/2001 | Eichstaedt et al. | 1/1 |
| 6,182,061 B1 | 1/2001 | Matsuzawa et al. | |

(Continued)

OTHER PUBLICATIONS

Petrini et al, "System-level fault-tolerance in large-scale parallel machines with buffered coscheduling", Parallel and Distributed Processing Symposium, 2004.*

(Continued)

*Primary Examiner* — Oanh Duong
(74) *Attorney, Agent, or Firm* — Morgan, Lewis & Bockius LLP

(57) ABSTRACT

A large-scale data processing system and method for processing data in a distributed and parallel processing environment. The system includes an application-independent framework for processing data having a plurality of application-independent map modules and reduce modules. These application-independent modules use application-independent operators to automatically handle parallelization of computations across the distributed and parallel processing environment when performing user-specified data processing operations. The system also includes a plurality of user-specified, application-specific operators, for use with the application-independent framework to perform a user-specified data processing operation on a user-specified set of input files. The application-specific operators include: a map operator and a reduce operator. The map operator is applied by the application-independent map modules to input data in the user-specified set of input files to produce intermediate data values. The reduce operator is applied by the application-independent reduce modules to process the intermediate data values to produce final output data.

27 Claims, 7 Drawing Sheets

Large-Scale Data Processing Model
100

(56) References Cited

U.S. PATENT DOCUMENTS

| | | |
|---|---|---|
| 6,192,359 B1 | 2/2001 | Tsuchida et al. |
| 6,292,822 B1 | 9/2001 | Hardwick ............... 718/105 |
| 6,321,373 B1 * | 11/2001 | Ekanadham et al. ......... 717/119 |
| 6,351,749 B1 | 2/2002 | Brown et al. |
| 6,453,360 B1 | 9/2002 | Muller et al. ............ 709/250 |
| 6,493,797 B1 | 12/2002 | Lee et al. |
| 6,622,301 B1 * | 9/2003 | Hirooka et al. ........... 717/149 |
| 7,146,365 B2 | 12/2006 | Allen et al. |
| 7,174,381 B2 | 2/2007 | Gulko et al. |
| 7,356,762 B2 * | 4/2008 | van Driel ............... 715/206 |
| 7,386,849 B2 | 6/2008 | Dageville et al. |
| 7,392,320 B2 * | 6/2008 | Bookman et al. ......... 709/231 |
| 7,756,919 B1 * | 7/2010 | Dean et al. ............. 709/201 |
| 7,917,574 B2 | 3/2011 | Liu |
| 8,255,905 B2 | 8/2012 | Sudzilouski et al. |
| 2002/0095260 A1 | 7/2002 | Huyn |
| 2002/0196799 A1 | 12/2002 | Remer et al. |
| 2003/0115439 A1 | 6/2003 | Mahalingam et al. |
| 2003/0120708 A1 * | 6/2003 | Pulsipher et al. ......... 709/106 |
| 2003/0120709 A1 * | 6/2003 | Pulsipher et al. ......... 709/106 |
| 2003/0177240 A1 | 9/2003 | Gulko et al. |
| 2003/0195931 A1 * | 10/2003 | Dauger ................ 709/205 |
| 2003/0204703 A1 * | 10/2003 | Rajagopal et al. ......... 711/216 |
| 2003/0233370 A1 | 12/2003 | Barabas et al. ........... 707/103 |
| 2004/0148273 A1 | 7/2004 | Allen et al. |
| 2004/0205057 A1 * | 10/2004 | Hutchison et al. .......... 707/3 |
| 2004/0226013 A1 * | 11/2004 | Mariotti et al. ............ 718/100 |
| 2004/0267807 A1 | 12/2004 | Barabas et al. |
| 2005/0044067 A1 | 2/2005 | Jameson |
| 2005/0234985 A1 | 10/2005 | Gordon et al. |
| 2006/0259246 A1 | 11/2006 | Huyn |
| 2008/0005525 A1 | 1/2008 | Rosenbluth et al. |
| 2009/0089544 A1 | 4/2009 | Liu |
| 2009/0327668 A1 | 12/2009 | Sudzilouski et al. |
| 2011/0208947 A1 * | 8/2011 | Lin et al. ............... 712/28 |

OTHER PUBLICATIONS

Barroso, L.A., et al., "Web Search for a Planet: The Google Cluster Architecture," *IEEE Micro*, 23(2):22-28, Apr. 2003.

Ghemawat, S., et al., "The Google File System," *19th Symposium on Operating Systems Principles*, pp. 29-43, Lake George, New York, 2003.

Rabin, M.O., "Efficient Dispersal of Information for Security, Load Balancing and Fault Tolerance," *Journal of the ACM*, 36(2):335-348, Apr. 1989.

Riedel, E., et al., "Active Disk for Large-Scale Data Processing," *IEEE Computer*, pp. 68-74, Jun. 2001.

Thain, D., et al., "Distributed Computing in Practice: The Condor Experience," *Concurrency and Computation: Practice and Experience*, 17:323-356, 2004.

Valiant, L.G., "A Bridging Model for Parallel Computation," *Communications of the ACM*, 33(8):103-111, Aug. 1990.

\* cited by examiner

Task Status Table

| Task ID | Status | Process | Input Files | Output Files | ... |
|---|---|---|---|---|---|
| Map0000 | Completed | P0000 | 12340 | 12341 | ... |
| Map0001 | Completed | P0001 | 12344 | 12345 | ... |
| ⋮ | ⋮ | | | | |
| Map0103 | In Progress | P0010 | 12030 | 12031 | ... |
| Map0104 | Failed | P0011 | 10101 | 12102 | ... |
| Map0103b | In Progress | P0010 | 12030 | 12031 | ... |
| ⋮ | ⋮ | | | | |
| Red0000 | In Progress | P0033 | 12340, ... | 14000 | ... |
| Red0001 | Waiting | - | - | - | ... |

*Figure 7A*

Process Status Table

| Process ID | Status | Location | Current | ... |
|---|---|---|---|---|
| P0000 | Busy | CPU001 | Task Map0000 | ... |
| P0001 | Busy | CPU011 | Task Map0001 | ... |
| ⋮ | ⋮ | | | |
| P0033 | Busy | CPU015 | Task Red0000 | ... |
| P0034 | Idle | CPU016 | None | ... |
| P0034 | Failed | CPU016 | None | ... |
| ⋮ | ⋮ | | | |
| P0100 | Busy | CPU031 | WQMaster | ... |

*Figure 7B*

SYSTEM AND METHOD FOR LARGE-SCALE DATA PROCESSING USING AN APPLICATION-INDEPENDENT FRAMEWORK

RELATED CASES

This application is a continuation of U.S. patent application Ser. No. 10/871,245, filed Jun. 18, 2004 now U.S. Pat. No. 7,756,919, entitled "Large Scale Data Processing in a Distributed and Parallel Processing Environment," which is hereby incorporated by reference in its entirety. This application is also related to U.S. patent application Ser. No. 10/871,244 filed Jun. 18, 2004, which is hereby incorporated by reference in its entirety.

TECHNICAL FIELD

The disclosed embodiments relate generally to data processing systems and methods, and in particular to a framework for simplifying large-scale data processing.

BACKGROUND

Large-scale data processing involves extracting data of interest from raw data in one or more datasets and processing it into a useful data product. The implementation of large-scale data processing in a parallel and distributed processing environment typically includes the distribution of data and computations among multiple disks and processors to make efficient use of aggregate storage space and computing power.

Various functional languages (e.g., LISP™) and systems provide application programmers with tools for querying and manipulating large datasets. These conventional languages and systems, however, fail to provide support for automatically parallelizing these operations across multiple processors in a distributed and parallel processing environment. Nor do these languages and systems automatically handle system faults (e.g., processor failures) and I/O scheduling.

SUMMARY

A system and method for large-scale data processing includes operations for automatically handling programming details associated with parallelization, distribution, and fault-recovery. In some embodiments, application programmers can process large amounts of data by specifying map and reduce operations. The map operations retrieve data (e.g., key/value pairs) from input data files and produce intermediate data values in accordance with the mapping operations. The reduce operations merge or otherwise combine the intermediate data values in accordance with the reduce operations (e.g., combining intermediate values that share the same key). In some embodiments, the system and methods use a master process to manage tasks and one or more local databases to reduce network traffic and file system (FS) reads.

In some embodiments, a system for large-scale processing of data in a parallel processing environment includes one or more map modules configured to read input data and to apply at least one application-specific map operation to the input data to produce intermediate data values. An intermediate data structure stores the intermediate data values. The system also includes reduce modules, which are configured to retrieve the intermediate data values from the intermediate data structure and to apply at least one user-specified reduce operation to the intermediate data values to provide output data. Preferably, the map and/or reduce operations are automatically parallelized across multiple processors in the parallel processing environment. The programs or instructions for handling parallelization of the map and reduce operation are application independent. The input data and the intermediate data values can include key/value pairs and the reduce operation can include combining intermediate data values having the same key. The intermediate data structure can include one or more intermediate data files coupled to each map module for storing intermediate data values. The map and reduce operations can be implemented on different processors coupled to a distributed network. The output data can be written to a file system, which is accessible via the distributed network.

In some embodiments, a system for large-scale processing of data in a parallel processing environment includes a set of interconnected computing systems. At least one of the computing systems includes a set of application independent map modules configured for reading portions of input files containing data, and for applying at least one application-specific map operation to the data to produce intermediate key-value pairs. The system also includes a set of application independent reduce modules, which are configured to apply at least one application-specific reduce operation to the intermediate key-value pairs so as to combine intermediate values sharing the same key. In one embodiment, the application independent map modules and application independent reduce modules are both incorporated into a same process, sometimes called a worker process.

BRIEF DESCRIPTION OF THE DRAWINGS

FIG. 7A is a block diagram of an exemplary task status table.

FIG. 7B is a block diagram of an exemplary process status table.

DESCRIPTION OF EMBODIMENTS

Large-Scale Data Processing Model

Figure 1:
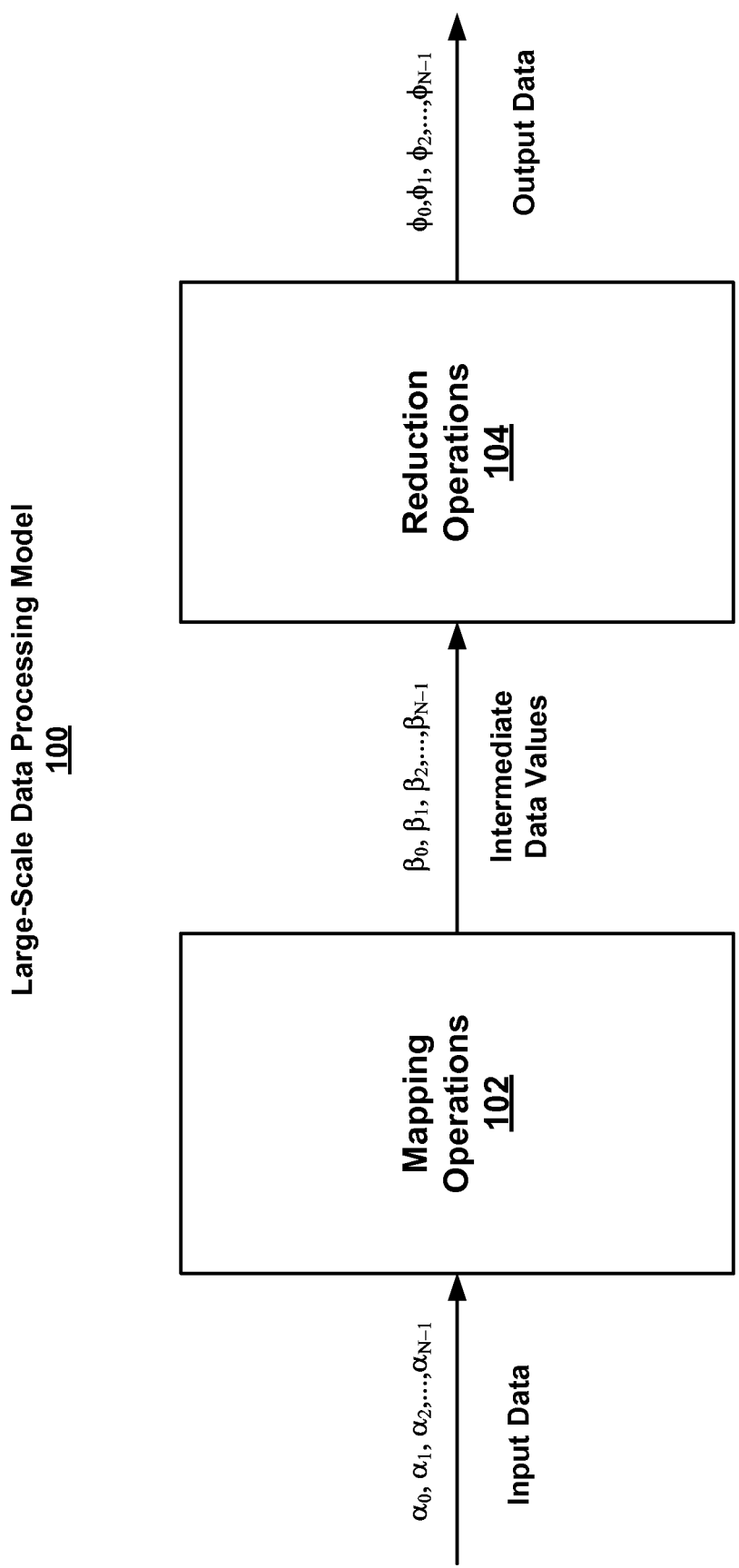
FIG. 1 is a block diagram of a large-scale data processing model.

FIG. 1 is a block diagram of a large-scale data processing model 100. The model 100 generally includes mapping operations 102 and reduction operations 104. The mapping operations 102 apply one or more mapping operations to a set of input data $\alpha_i$ (e.g., text files, records, logs, sorted maps, etc.) to provide a set of intermediate data values $\beta_i$. The reduction operations 104 apply one or more reduction operations to the set of intermediate data values $\beta_i$ to provide a set of output data $\phi_i$ (e.g., tables, sorted maps, record I/O, etc.). In some embodiments, the mapping operations 102 are implemented by one or more application-specific mapping functions, which map a set of input data $\alpha_i$ to a set of intermediate data values $\beta_i$. The intermediate data values $\beta_i$ are stored in one or more intermediate data structures. Some examples of intermediate data structures include, without limitation, files, buffers, histograms, count tables and any other suitable data structure or device for storing digital information. The intermediate data values $\beta_i$ are processed by the reduction operations 104, which are implemented by one or more application-specific reduction functions, which reduce the set of intermediate data values $\beta_i$ to a set of output data $\phi_i$.

Distributed Data Processing System

In order to explain the operation of the large scale data processing system, it is helpful to consider an exemplary distributed data processing system in which the large scale data processing is performed. In general, the embodiments described here can be performed by a set of interconnected processors that are interconnected by one or more communication networks.

Figure 5:
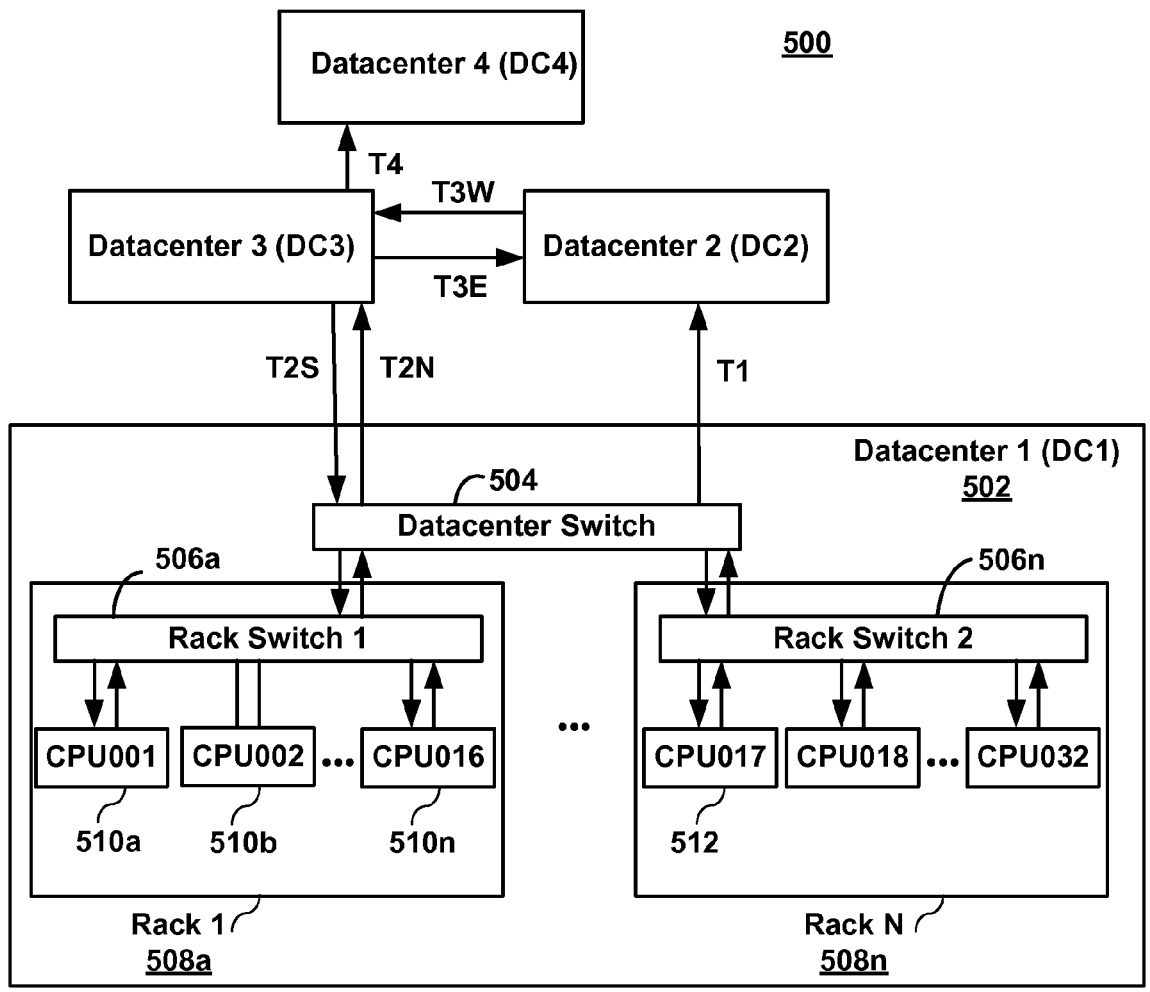
FIG. 5 is a block diagram of a data distribution network for large-scale data processing.

FIG. 5 is a block diagram of an exemplary distributed data processing system 500. It should be appreciated that the layout of the system 500 is merely exemplary and the system 500 may take on any other suitable layout or configuration. The system 500 is used to store data, perform computational tasks, and transmit data between datacenters DC1-DC4. The system may include any number of data centers DCx, and thus the number of data centers shown in FIG. 5 is only exemplary. The system 500 may include dedicated optical links or other dedicated communication channels, as well as supporting hardware such as modems, bridges, routers, switches, wireless antennas and towers, and the like. In some embodiments, the network 500 includes one or more wide area networks (WANs) as well as multiple local area networks (LANs). In some embodiments, the system 500 utilizes a private network, i.e., the system and its interconnections are designed and operated exclusively for a particular company or customer. Alternatively, a public network may be used.

Some of the datacenters DC1-DC4 may be located geographically close to each other, and others may be located far from the other datacenters. In some embodiments, each datacenter includes multiple racks. For example, datacenter 502 (DC1) includes multiple racks 508a, . . . , 508n. The racks 508 can include frames or cabinets into which components are mounted. Each rack can include one or more processors (CPUs) 510. For example, the rack 508a includes CPUs 510a, . . . , 510n (slaves 1-16) and the nth rack 506n includes multiple CPUs 510 (CPUs 17-31). The processors 510 can include data processors, network attached storage devices, and other computer controlled devices. In some embodiments, at least one of processors 510 operates as a master processor, and controls the scheduling and data distribution tasks performed throughout the network 500. In some embodiments, one or more processors 510 may take on one or more roles, such as a master and/or slave. A rack can include storage (e.g., one or more network attached disks) that is shared by the one or more processors 510.

In some embodiments, the processors 510 within each rack 508 are interconnected to one another through a rack switch 506. Furthermore, all racks 508 within each datacenter 502 are also interconnected via a datacenter switch 504. As noted above, the present invention can be implemented using other arrangements of multiple interconnected processors.

Further details regarding the distributed network 500 of FIG. 5 can be found in U.S. patent application Ser. No. 10/613,626, entitled "System and Method For Data Distribution," filed Jul. 3, 2003, which application is incorporated by reference herein in its entirety.

In another embodiment, the processors shown in FIG. 5 are replaced by a single large-scale multiprocessor. In this embodiment, map and reduce operations are automatically assigned to processes running on the processors of the large-scale multiprocessor.

Large-Scale Data Processing System I

Figure 2:
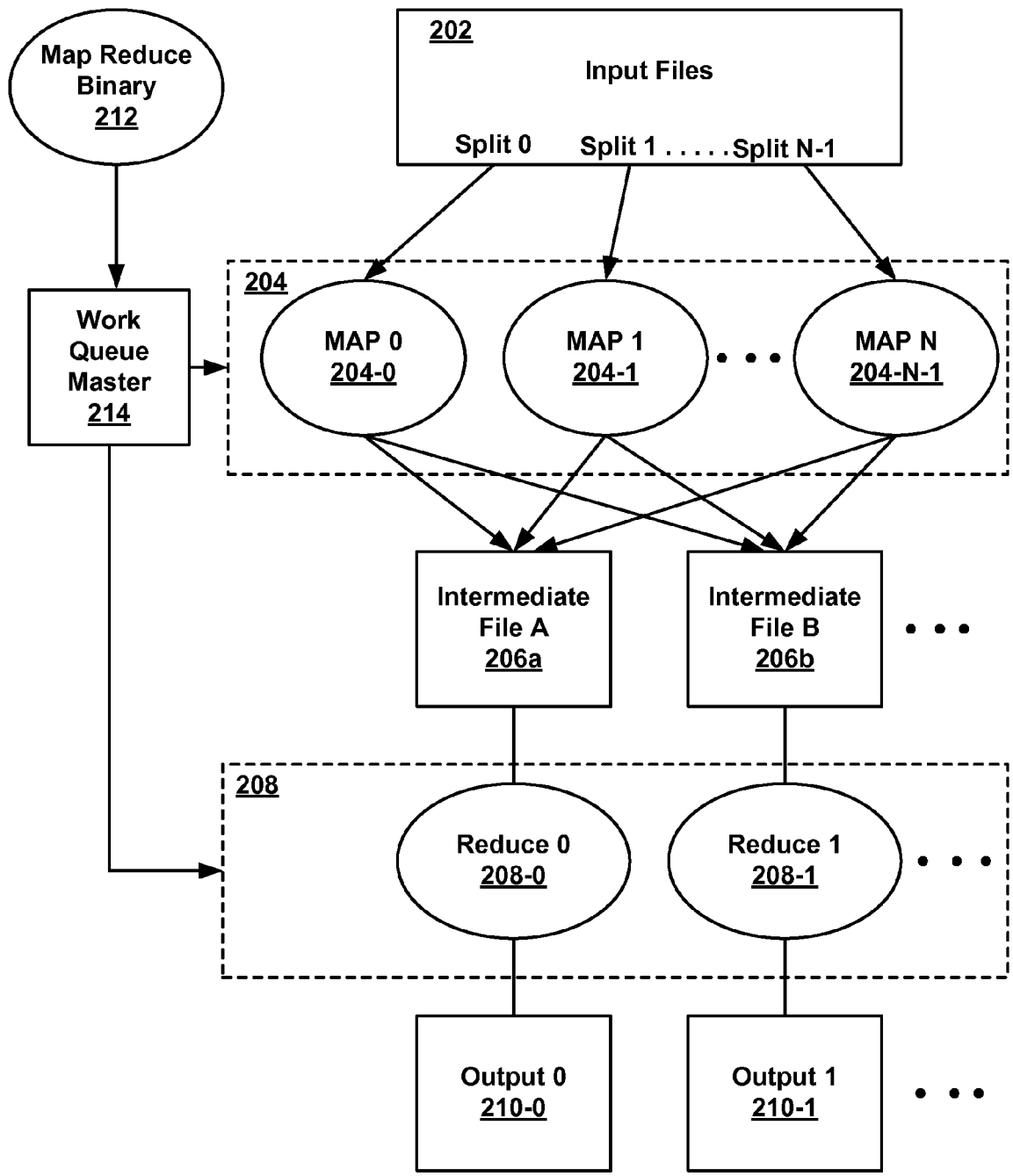
FIG. 2 is a block diagram of a large-scale data processing system.

FIG. 2 is a block diagram of a large-scale data processing system 200. The system 200 provides application programmers with an application-independent framework for writing data processing software that can run in parallel across multiple different machines on a distributed network. The system 200 is typically a distributed system having multiple processors, possibly including network attached storage nodes, that are interconnected by one or more communication networks. FIG. 2 provides a logical view of a system 200, which in some embodiments may be implemented on a system having the physical structure shown in FIG. 5. In one embodiment, the system 200 operates within a single data center of the system 500 shown in FIG. 5, while in another embodiment, the system 200 operates over two or more data centers of the system 500.

As shown in FIG. 2, a set of input files 202 are processed by a first set of processes 204, herein called map processes, to produce a set of intermediate data, represented here by files 206. The intermediate data 206 is processed by a second set of processes 208, herein called reduce processes, to produce output data 210. Generally each "map process" is a process configured (or configurable) to perform map functions and to execute an application-specific map operator. Each "reduce process" is a process configured (or configurable) to perform reduce functions and to execute an application-specific reduce operator. A control or supervisory process, herein called the work queue master 214, controls the set of processing tasks. As described in more detail below, the work queue master 214 determines how many map tasks to use, how many reduce tasks to use, which processes and processors to use to perform those tasks, where to store the intermediate data and output data, how to respond to any processing failures, and so on.

It should be noted that the work queue master 214 assigns tasks to processes, and that multiple processes may be executed by each of the processors in the group of processors that are available to do the work assigned by the work queue master 214. In the context of FIG. 5 or any other multiple processor system, the set of processes controlled by the work queue master 214 may be a subset of the full set of processes executed by the system, and furthermore the set of processors available to do the work assigned by the work queue master 214 may be fewer than the full set of processors in the system. Some of the resources of the system may be used for other tasks, such as tasks that generate the input data 202, or that utilize the output data 210. However, in some embodiments, some or all of the tasks that generate the input data 202 or utilize the output data 210 may also be controlled or supervised by the work queue master 214. In addition, in some embodiments processors can be added or removed from the processing system during the execution of a map-reduce operation. The work queue master 214 keeps track of the processors in the system and the available processes executing on those processors.

Application programmers are provided with a restricted set of application-independent operators for reading input data and generating output data. The operators invoke library functions that automatically handle data partitioning, parallelization of computations, fault tolerance (e.g., recovering from process and machine failures) and I/O scheduling. In some embodiments, to perform a specific data processing operation on a set of input files, the only information that must be provided by an application programmer provide is: information identifying of the input file(s), information identifying or specifying the output files to receive output data, and two application-specific data processing operators, hereinafter referred to as map( ) and reduce( ). Generally, the map( ) operator specifies how input data is to be processed to produce intermediate data and the reduce( ) operator specifies how the intermediate data values are to be merged or otherwise combined. Note that the disclosed embodiments are not limited to any particular type or number of operators. Other types of operators (e.g., data filters) can be provided, as needed, depending upon the system 200 architecture and the data processing operations required to produce the desired, application-specific results. In some embodiments, the application programmers provide a partition operator, in addition to the map( ) and reduce( ) operators. The partition( ) operator, specifies how the intermediate data is to be partitioned over a set of intermediate files.

To perform large-scale data processing, a set of input files 202 are split into multiple data blocks 0, ..., N−1 of either a specified or predefined size (e.g., 64 MB). Alternately, in some embodiments the input files 202 have a predefined maximum size (e.g., 1 GB), and the individual files are the data blocks. A data block is a subset of data that is retrieved during processing. In some embodiments, the data blocks are distributed across multiple storage devices (e.g., magnetic or optical disks) in a data distribution network to fully utilize the aggregate storage space and disk bandwidth of the data processing system.

Referring to FIGS. 2 and 5, in some embodiments the input data files 202 are stored in one or more data centers DC1-DC4. Ideally, the work queue master 214 assigns tasks to processors 510 in datacenters where the input files are stored so as to minimize network traffic whenever possible. In some embodiments, the work queue master 214 uses input file information received from a file system to determine the appropriate processor or process for executing a task, using a hierarchical decision process. When a process in a processor in a datacenter DC1-DC4 is idle, it requests a task from the work queue master 214. The work queue master 214 searches the input file information received from the file system (e.g., FS 446, FIG. 5), for an unprocessed data block on the machine assigned to process the task. If none are available, the work queue master 214 searches the file information for an unprocessed data block on the same rack 508 as the machine assigned to process the task. If none are available, the work queue master 214 searches the file information for an unprocessed data block in the same datacenter as the machine assigned to process the task. If none are available, the work queue master 214 will search for unprocessed blocks in other datacenters.

By using a hierarchical assignment scheme, data blocks can be processed quickly without requiring large volumes of data transfer traffic on the network 500. This in turn allows more tasks to be performed without straining the limits of the network 500.

Task Management

Referring again to FIG. 2, application programmers develop the map( ) and/or reduce( ) operators, which are computer programs that process input data and intermediate, respectively. In some embodiments these operators are compiled into binary files 212 suitable for use on a particular processing platform. The binary files 202 are loaded into a work queue master module 214, which manages jobs submitted by users of the system 200. In some embodiments, the work queue master 214 loads (or causes to be loaded) onto each process to which it allocates a map or reduce task, the library procedures, and the map( ) or reduce( ) operator required to perform the task assigned to the process.

The work queue master 214, when it receives a request to process a set of data using a specified set application-specific map( ) reduce( ) and, optionally, partition( ) operators, determines the number of map tasks and reduce tasks to be performed to process the input data. This may be based on the amount of input data to be processed. For example, a job may include 10,000 map tasks and 10 reduce tasks. In some embodiments, the work queue master module generates a task status table having entries representing all the tasks to be performed, and then begins assigning those tasks to idle processes. As noted above, tasks may be allocated to idle processes based on a resource allocation scheme (e.g., priority, round-robin, weighted round-robin, etc.).

Process and Task Status Tracking

Figure 6:
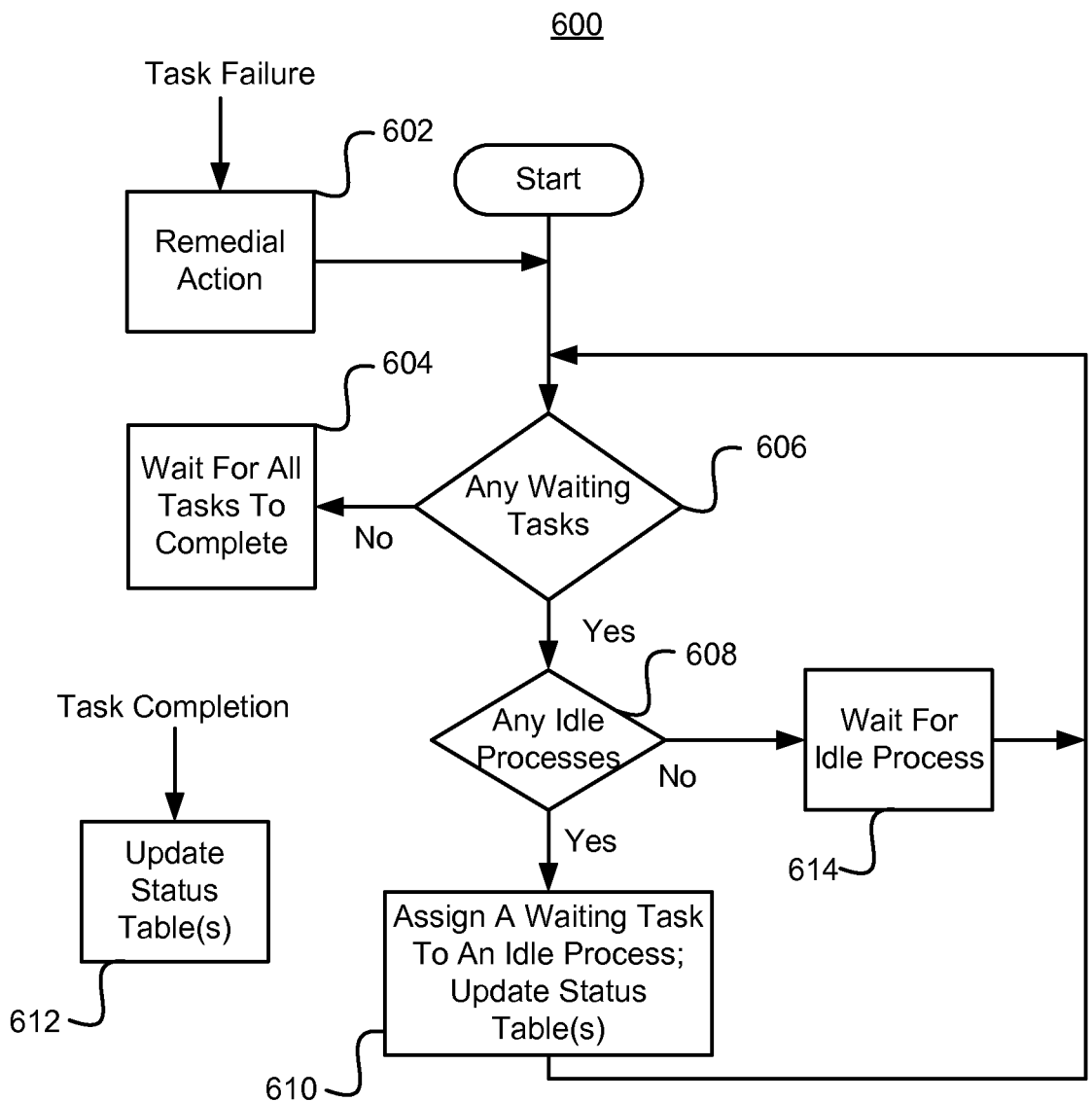
FIG. 6 is a flow diagram of an embodiment of a process for assigning tasks to processes.

FIG. 6 is a flow diagram of an embodiment of a process 600 for assigning tasks to processes. Process 600 parallelizes a data processing task over as many processes as is consistent with the available computing resources. While the process 600 described below includes a number of steps that appear to occur in a specific order, it should be apparent that the process 600 steps are not limited to any particular order, and, moreover, the process 600 can include more or fewer steps, which can be executed serially or in parallel (e.g., using parallel processors or a multi-threading environment). Further, it should noted that the steps or acts in process 600 are application-independent and are implemented using modules or instructions that are application-independent. Only the actual map and reduce operators, which produce intermediate data values from the input data and that produce output data from the intermediate data values, respectively, are application-specific. These application-specific operators are invoked by the map and reduce tasks assigned to processes in step 610. By making a clear boundary between the application-independent aspects and application-specific aspects of performing a large scale data processing operation, the application-independent aspects can be optimized, thereby making the entire large scale data processing operation very efficient.

The process 600 begins by determining if there are tasks waiting to be assigned to a process (step 606). If there are no tasks waiting, then the process 600 waits for all the tasks to complete (step 604). If there are tasks waiting, then the process 600 determines if there are any idle processes (step 608). If there are idle processes, then the process 600 assigns a waiting task to an idle process (step 610) and returns to step 606. If there are no idle processes, the process 600 waits for an idle process (step 614). Whenever a process completes a task, the process sends a corresponding message to the work queue master 214, which updates the process and task status tables (step 612). The work queue master 214 may then assign a new task to the idle process, if it has any unassigned tasks waiting for processing resources. For reduce tasks, the work queue master 214 may defer assigning any particular reduce task to an idle process until such time that the intermediate data to be processed by the reduce task has, in fact, been generated by the map tasks. Some reduce tasks may be started long before the last of the map tasks are started if the intermediate data to be processed by those reduce tasks is ready for reduce processing.

In some embodiments, whenever a process fails, which may be discovered by the work queue master 214 using any of a number of known techniques, the work queue master 214 (A) determines what task was running in the failed process, if any, (B) assigns that task to a new process, waiting if necessary until an idle process becomes available, and (C) updates its process and task status tables accordingly. In some embodiments, the work queue master 214 may undertake remedial measures (step 602), such as causing the failed process to be restarted or replaced by a new process. In some embodiments, the work queue master may further detect when such remedial measures fail and then update its process status table to indicate such failures. In addition, in some embodiments, when a map task fails and is restarted in a new process, all processes executing reduce tasks are notified of the re-execution so that any reduce task that has not already read the data produced by the failed process will read the data produced by the new process.

FIG. 7A shows an exemplary task status table for keeping track of the status of map and reduce tasks. In some embodiments, each task (e.g., map, reduce) is assigned task ID, a status, a process, and one or more input files and output files. In some embodiments, the input files field may specify a portion of an input file (e.g., where the portion comprises a data block) to be processed by the task, or this field may specify portions of two of more input files. The status field indicates the current status of the task (e.g., waiting, in-progress, completed, or failed), which is being performed by the assigned process identified in the process field. The process retrieves data from one or more input files (or the one or more input file portions) identified in the input file field and writes the results of the task ID to one or more output files identified in the output file field. For example, in FIG. 7A, task Red0000 is assigned to process P0033, which is still in progress. The process P0033 retrieves data blocks from input file 12340 (e.g., intermediate file A, FIG. 2) and writes the results of the task to output file 14000. In some embodiments, until a task is assigned to a process, the process field in the task status table indicates that no process has yet been assigned to perform that task. It should be apparent that there could be more or fewer fields in the task status table than shown in FIG. 7A, such as multiple fields for identifying output and input files.

FIG. 7B shows a process status table for keeping track of the status of all the processes to which the work queue master 214 can assign tasks. In some embodiments, each process is assigned to a task and a location. In some embodiments, each process is permanently assigned to a particular location (i.e., a particular processor). The status field indicates the current status of the process, which performs the assigned task at the assigned location. For example, process P0010 is "Busy" performing task Map0103 on location CPU011. It should be apparent that there could be more or fewer field in the process status table than shown in FIG. 7B, such as assigning multiple locations assigned to a single task (e.g., parallel processing).

Map Phase

In some embodiments, the set of application-specific data processing operations that the map( ) operator can perform is constrained. For example, in some embodiments, the map( ) operator may be required to process the input data one record at a time, proceeding monotonically from the first record to the last record in the data block being processed. In some embodiments, the map( ) operator may be required to generate its output data in the form of key/value pairs. Either the key or value or both can comprise structured data, as long as the data can be encoded into a string. For example, the key may have multiple parts, or the value may have multiple parts.

By requiring the map( ) operator's output to be in the form of key/value pairs, the resulting intermediate data can be mapped to a set of intermediate data files in accordance with a partition( ) operator. An exemplary partition( ) operator may specify that all intermediate data is to be directed to an intermediate file corresponding to the value of the first byte of the key. Another exemplary partition( ) operator may specify that all intermediate data is to be directed to an intermediate file corresponding to the value of the function "hash(Key) modulo N", where N is a value specified by the application programmer and "hash(Key)" represents the value produced by applying a hash function to the key of the key/value pairs in the intermediate data. In some embodiments, the partition operator is always a modulo function and the application programmer only specifies the modulus to be used by the modulo function. In one embodiment, the partition operator is automatically selected by the work queue master 214, or by one of the application-independent library functions, discussed below.

In some embodiments, the data blocks $0, \ldots, N-1$ are automatically assigned to map tasks (executed by map processes 204-0, ..., 204-N-1) in an application independent manner, by the work queue master 214. In particular, the work queue master 214 is configured to determine the number of data blocks to be processed, and to create a corresponding number of instances of the map process 204. Stated in another way, the work queue master 214 assigns a corresponding number of map tasks to processes, as suitable processes become available. Since the number of map tasks may exceed the number of processes available to the work queue master 214, the work queue master 214 will assign as many map tasks as it can to available processes, and will continue to assign the remaining map tasks to processes as the processes complete previously assigned tasks and become available to take on new tasks. The work queue master 214 uses the task status table and process status tables, described above, to coordinate its efforts.

Reduce Phase

Application independent reduce modules 208 read intermediate data values (e.g., key/value pairs) from the intermediate files 206. In some embodiments, each reduce module 208 reads from only one intermediate file 206. The reduce modules 208 sort the intermediate data values, merge or otherwise combine sorted intermediate data values having the same key and then write the key and combined values to one or more output files 210. In some embodiments, the intermediate file 206 and the output files 210 are stored in a File System (FS), which is accessible to other systems via a distributed network.

Software Implementation

In some embodiments, the map and reduce modules 204 and 208 are implemented as user-defined objects with methods to carry out application-specific processing on data using known object oriented programming techniques. For example, a MapReduction base class can be created that includes methods and data for counting the number of input files that contain a particular term or pattern of terms, sorting the results of the sort, eliminating duplicates in the sorted results and counting the number of occurrences of the term. Application programmers can derive other classes from the base class and instantiate the base class as an object in the application code to access its data and methods.

Large-Scale Data Processing System II

While the system 200 provides good performance for many large-scale data processing, the performance of the system 200 may diminish as the amount of data to be processed and thus the number of tasks increases. For instance, performance may be diminished when the size of the data blocks is decreased, thereby increasing the number of map tasks. Since the intermediate files 206 are stored in the FS, an increase in tasks results in an increase in intermediate file access requests and an associated increase in network traffic. Additionally, a single work queue master 214 can only handle a limited number of task assignments per time period, beyond which the work queue master 214 begins to limit system performance. Increasing the size of those tasks to accommodate additional jobs could result in load imbalances in the system 200. These performance issues are addressed in the system 300, which is described below with respect to FIG. 3.

Figure 3:
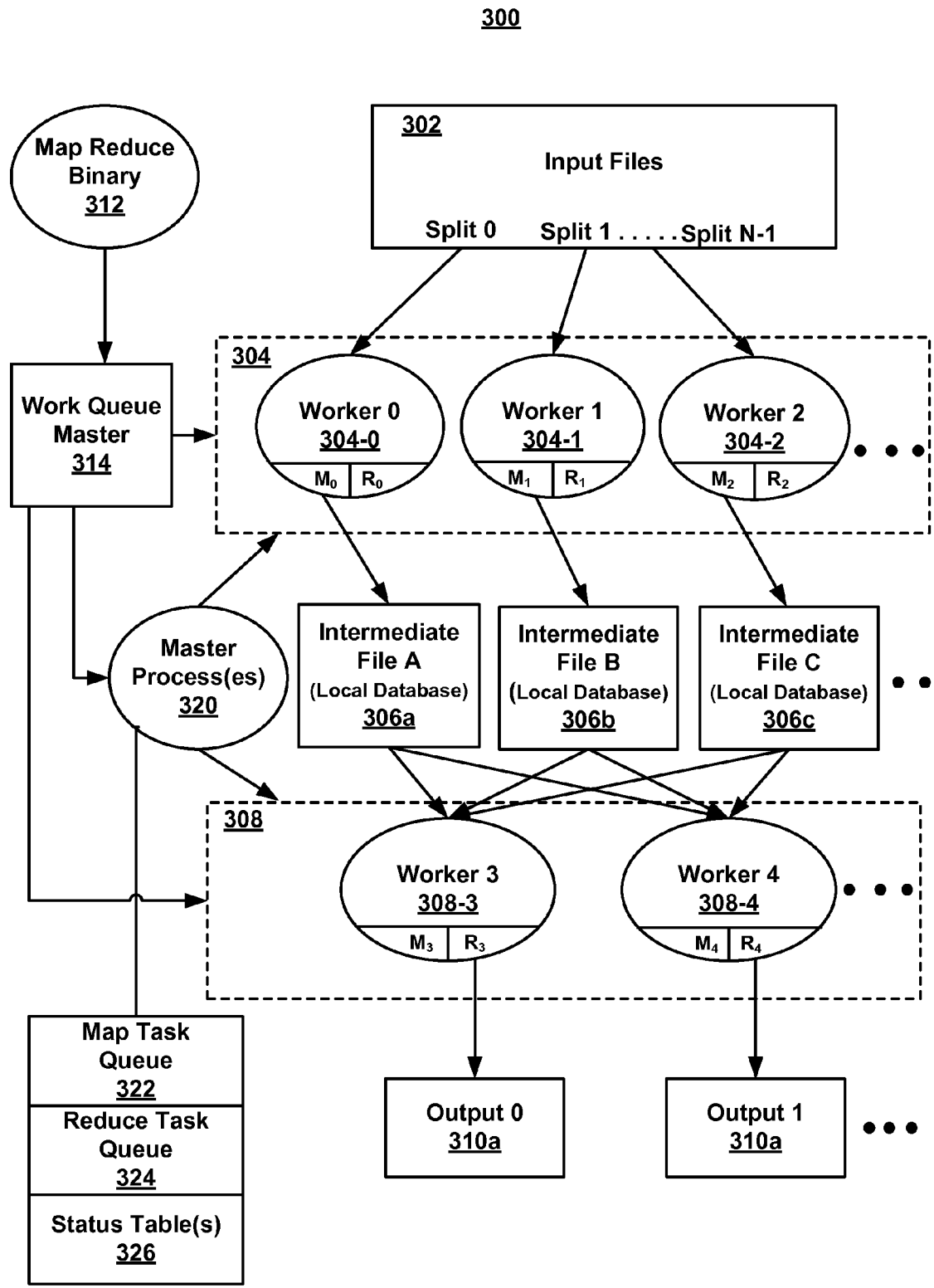
FIG. 3 is a block diagram of a large-scale data processing system, including a master process for managing tasks.

FIG. 3 is a block diagram of a large-scale data processing system 300, including a master process 320 (sometimes called a supervisory process) for managing tasks. In system 300, one or more master processes 320 assign one or more tasks to one or more worker processes 304 and 308. In some embodiments, the master process 320 is a task itself (e.g., task 0) initiated by the work queue master module 314 and is responsible for assigning all other tasks (e.g., mapping and reducing tasks) to the worker processes 304, 308, in a master/slave type relationship. The worker processes 304, 308 include two or more process threads, each of which can be invoked based on the particular task assigned to it by the master process 320. For example, each worker process 304 invokes a map thread to handle an assigned map task and invokes a reduce thread to handle an assigned reduce task. In one embodiment, the worker processes 304, 308 include one or more additional threads. For example, a distinct thread may be used to receive remote procedure calls (e.g., from the master process) and to coordinate work done by the other threads. In another example, a distinct thread may be used to handle remote read requests received from other processors (i.e., peers) in the system.

In one embodiment, the number of worker processes is equal to the number of machines available in the system 300 (i.e., one worker process per machine). In another embodiment, two or more worker processes are used in each of the machines in the system 300. If a worker process fails, its task is reassigned to another worker process by the master process 320. In some embodiments, the master process 320 or the work queue master 314 may undertake remedial measures to repair, restart or replace a failed worker process.

In some embodiments, when the work queue master 314 receives a map/reduce data processing job, the work queue master 314 allocates the job to a master process 320. The master process 320 determines the number (M) of map tasks and the number (R) of reduce tasks to be performed, and then makes a request to the work queue master 314 for M+R processes (M+R+1, including the master process 320) to be allocated to the map/reduce data processing job. The work queue master 314 responds by assigning a number of processes to the job, and sends that information to the master process 320, which will then manage the performance of the data processing job. If the number of processes requested exceeds the number of processes available, or otherwise exceeds the number of processes that the work queue master 314 is allowed to assign to the job, the number of processes assigned to the job will be less than the number requested.

In some embodiments, all R of the reduce tasks are all immediately assigned to processes, but the reduce tasks do not begin work (e.g., on data sorting) until the master process 320 informs them that there are intermediate files ready for processing. In some embodiments, a single worker process 304/308 can be assigned both a map task and a reduce task, simultaneously (with each being executed by a distinct process thread), and therefore assigning reduce tasks to processes at the beginning of the job does not reduce the throughput of the system.

Map Phase

The division of input files 302 into data blocks 0, . . . , N−1, may be handled automatically by the application independent code. Alternately, the user may set an optional flag, or specify a parameter, so as to control the size of the data blocks into which the input files are divided. Furthermore, the input data may come from sources other than files, such as a database or in-memory data structures.

The input data blocks 0, . . . , N−1, which may in some embodiments be treated as key/value pairs, are read by application independent worker processes 304-0, . . . , 304-N−1, as shown in FIG. 3. The input files 302 can include a variety of data types typically used in data processing systems, including without limitation text files, record I/O, sorted data structures (such as B-trees), tables and the like. Each of the worker processes 304 to which a map task has been assigned applies the application-specific map( ) operator to the respective input data block so as generate intermediate data values. The intermediate data values are collected and written to one or more intermediate files 306, which are stored locally at the machine (e.g., in one or more local databases) in which the worker process 304 is executed. The intermediate files 306 are retained (i.e., they are persistent) until the reduce phase completes. Note that in some embodiments, each of the intermediate files 306 receives output from only one worker process 304, as shown in FIG. 3. When a worker process 304 completes its assigned task, it informs the master process 320 of the task status (e.g., complete or error). If the task was successfully completed, the worker process's status report is treated by the master process 320 as a request for another task.

In some embodiments, if there are enough worker processes 304 that all the intermediate values can be held in memory across the worker processes, then the system need not write any data to files on local disks. This optimization reduces execution time for map-reduce operations in which the number of worker processes is sufficient to handle all the map tasks at once, and the amount of intermediate data is sufficiently small to be kept in memory.

Application-Specific Combiner Function

In some cases, there is significant repetition in the intermediate keys produced by each map task, and the application-specific Reduce function is both commutative and associative. When all these conditions apply, a special optimization can be used to significantly reduce execution time of the map-reduce task. An example of a situation in which the optimization can be applied is a map-reduce operation for counting the number of occurrences of each distinct word in a large collection of documents. In this example, the application-specific map function (sometimes called the map( ) operator elsewhere in this document) outputs a key/value pair for every word w in every document in the collection, where the key/value pair is <w, 1>. The application-specific reduce function (sometimes called the reduce( ) operator elsewhere in this document) for this example is:

```
input data is "values";
int result=0; // initialize result to zero
for each v in values:
        result += ParseInt(v);
output: <key, result>
```

Each map task in this example will produce hundreds or thousands of records of the form <word, 1>. The Reduce function simply adds up the count values. To help conserve network bandwidth for map-reduce operations that satisfy these properties, the user may provide an application-specific Combiner function or operator. The Combiner function is invoked with each unique intermediate key and a partial set of intermediate values for the key. This is similar to the Reduce function, except that it gets executed at the end of each Map task by the same machine and process that performed by Map task. The Combiner function partially summarizes the intermediate key/value pairs. In fact, when using a Combiner function, the same function is typically specified for the Combiner and Reduce operations. The partial combining performed by the Combiner operation significantly speeds up certain classes of Map-Reduce operations, in part by significantly reducing the amount of information that must be conveyed from the processors that handle Map tasks to processors handling Reduce tasks, and in part by reducing the complexity and computation time required by the data sorting and Reduce function performed by the Reduce tasks.

Reduce Phase

Application independent worker processes 308 which have been assigned reduce tasks read data from the locally stored intermediate files 306. In some embodiments, the master process 320 informs the worker processes 308 where to find intermediate data files 306 and schedules read requests for retrieving intermediate data values from the intermediate data files 306. In some embodiments, each of the worker processes 308 reads a corresponding one of the intermediate files 306 produced by all or a subset of the worker processes 304. For example, consider a system in which each of the worker processes 304 assigned a map task outputs M (e.g., 100) intermediate files, which we will call Partion-1,j through Partition-M,j, where j is an index identifying the map task that produced the intermediate files. The system will have 100 worker processes 308, Worker-1 to Worker-M, each of which reads a corresponding subset of the intermediate files, Partition-p,j for all valid values of "j," produced by the worker processes 304, where "p" indicates the partition assigned to a particular worker process Worker-P (304) and "j" is an index identifying the map tasks that produced the intermediate files.

Each worker process 308 sorts the intermediate data values in the subset of the intermediate files read by that worker process in accordance with the key of the key/value pairs in the intermediate data. The sorting of the key/value pairs is an application independent function of the reduce threads in the worker processes 308. Each worker process 308 also merges or otherwise combines the sorted intermediate data values having the same key, and writes the key and combined values to one or more output files 310. The merging or other combining operation performed on the sorted intermediate data is performed by an application-specific reduce( ) operator. In some embodiments, the output files 310 are stored in a File System, which is accessible to other systems via a distributed network. When a worker process 308 completes its assigned reduce task, it informs the master process 320 of the task status (e.g., complete or error). If the reduce task was completed successfully, the worker process's status report is treated by the master process 320 as a request for another task. If the reduce task failed, the master process 320 reassigns the reduce task to another worker process 308.

Recovering From Task and Processor Failures

In some embodiments, the master process 320 is configured to detect task and processor failures. When a task failure is detected, the master process 320 reassigns the task to another process. In some embodiments, the master process 320 redistributes the work of the failed task over a larger number of tasks so as to complete that task more quickly than by simply re-executing the task on another process. The master process subdivides the work assigned to the failed task to a plurality of newly mini-tasks, and then resumes normal operation by assigning the mini-tasks to available processes. The number of mini-tasks may be a predefined number, such as a number between 8 and 32, or it may be dynamically determined based on the number of idle processes available to the master process. In the case of a failed map task, division of the work assigned to the failed task means assigning smaller data blocks to the mini-tasks. In the case of a failed reduce task, division of the work assigned to the failed task may mean assigning the data sorting portion of the reduce task to a larger number of worker processes, thereby performing a distributed sort and merge. The resulting sorted data may, in some embodiments, be divided into a number of files or portions, each of which is then processed using the reduce( ) operator to produce output data. By detecting such failures and taking these remedial actions, the amount of delay in completing the entire data processing operation is significantly reduced.

When a processor failure is detected by the master process 320, it may be necessary to re-execute all the tasks that the failed processor completed as well as any tasks that were in process when the processor failed, because the intermediate results produced by map tasks are stored locally, and the failure of the processor will in many cases make those results unavailable. Using the status tables, described above, the master process 320 determines all the tasks that ran on the processor, and also determines which of those tasks need to be re-executed (e.g., because the results of the tasks are unavailable and are still needed). The master process 320 then updates its status tables to indicate that these identified tasks are waiting for assignment to worker tasks. Thereafter, re-execution of the identified tasks is automatically handled using the processes and mechanisms described elsewhere in this document.

In some embodiments, an additional mechanism, herein called backup tasks, is used to guard against task failures as well as task slow downs. One of the main problems that lengthens the total time taken for a map-reduce operation to complete is the occurrence of "straggler" tasks or machines. A straggler is a process or machine that takes an unusually long time to complete one of the last few map or reduce tasks in the computation. Stragglers can arise for many reasons, including both hardware and software errors or conditions. When a large map-reduce operation is divided into thousands of map and reduce tasks executed by thousands of processes, the risk of a straggler task occurring is significant. The use of backup tasks, as described next, effectively guards against stragglers, without regard to the cause of the problem causing a process or machine to run slowly. In these embodiments, the master process determines when the map-reduce operation is close to completion. In one embodiment, the criteria for being close to completion is that the percentage of map tasks that have completed is above a threshold. In another embodiment, the criteria for being close to completion is that the percentage of map and reduce tasks, taken together, that have completed is above a threshold. The threshold can be any reasonably number, such as 95, 98, or 99 percent, or any percentage above 90 percent. Once the master process determines that the map-reduce operation is close to completion, the master process schedules backup executions of all remaining tasks. These duplicate tasks may be called backup map tasks and backup reduce tasks. FIG. 7A shows an exemplary backup task, Map103b, in the task status table. Each task is marked as completed when either the primary or backup execution completes. This mechanism obviously increases the computational resources, and thus in some embodiments the criteria for invoking this mechanism are selected so as to increase the computational resources by no more than a few percent (e.g., five percent). The use of backup tasks significantly reduces the time to complete large map-reduce operations, often by more than twenty-five percent.

Master Process & Status Tables

The master process 320 is responsible for assigning tasks to the worker processes 304 and 308 and for tracking their status and output. Periodically, the master process 320 solicits a report from each worker process assigned a task to determine its task status. In some embodiments, the report can be solicited using a polling scheme (e.g., round-robin). If the task status indicates that the worker process has failed, then the task is put back in the appropriate task queue to be reassigned to another worker process. In some embodiments, the master process 320 maintains status tables 326 for managing tasks, as described with respect to FIGS. 7A and 7B.

In one embodiment in which more than one master process 320 is used, a locking mechanism is used to ensure that each of the entries of the status tables is modified by only one of the master processes at any one time. Whenever a master process 320 attempts to assign a map or reduce task to a process, or perform any other management of a map or reduce task, the master process first acquires (or attempts to acquire) a lock on the corresponding status table entry. If the lock is refused, the master process concludes that the map/reduce task is being managed by another master process and therefore the master process looks for another map/reduce task to manage. In another embodiment, the task status table is divided into portions, with each master process being given ownership of a corresponding portion of the task status table, and responsibility for managing the map/reduce tasks in that portion of the task status table. Each master process can read other portions of the task status table, but only uses information in entries indicating that the corresponding task has been completed.

The system 300 provides several advantages over other systems and methods by using one or more master processes to assign and manage tasks, together with local databases to store intermediate results produced by the tasks. For example, by distributing file reads over multiple local databases more machines can be used to complete tasks faster. Moreover, since smaller tasks are spread across many machines, a machine failure will result in less lost work and a reduction in the latency introduced by such failure. For example, the FS load for system 200 is O(M*R) file opens and the FS load for system 300 is O(M) input file opens+O(R) output file opens, where M is the number of map tasks and R is the number of reduce tasks. Thus, the system 200 requires significantly more file system file open operations than the system 300.

Computer System for Large-Scale Data Processing

Figure 4:
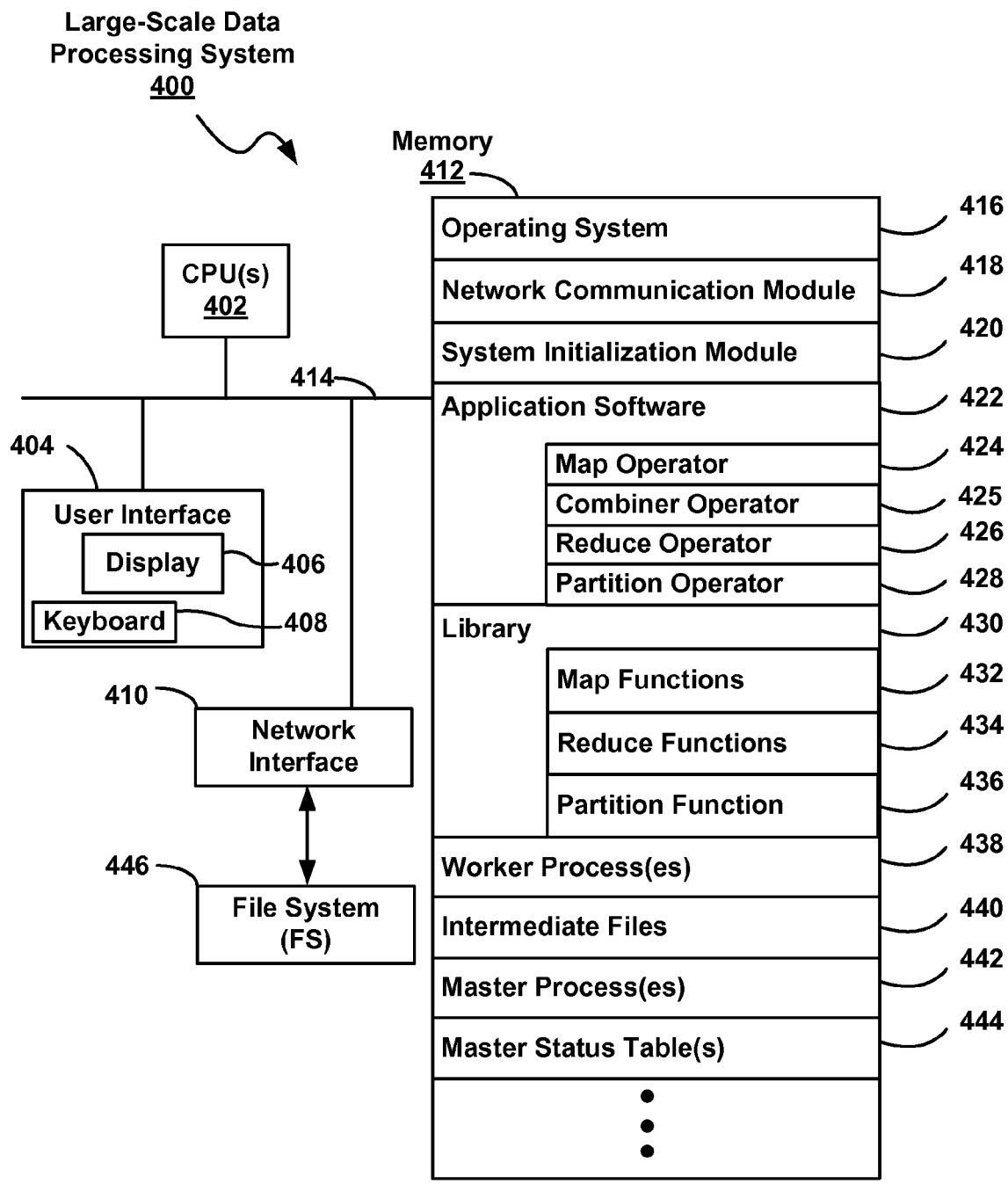
FIG. 4 is a block diagram of a computer system for the data processing systems shown in FIGS. 2 and 3.

FIG. 4 is a computer system 400 for the data processing systems 200 and 300 shown in FIGS. 2 and 3. The computer system 400 generally includes one or more processing units (CPUs) 402, one or more network or other communications interfaces 410, memory 412, and one or more communication buses 414 for interconnecting these components. The system 400 may optionally include a user interface 404, for instance a display 406 and a keyboard 408. Memory 412 may include high speed random access memory and may also include non-volatile memory, such as one or more magnetic disk storage devices. Memory 412 may include mass storage that is remotely located from the central processing unit(s) 402.

The memory 412 stores an operating system 416 (e.g., Linux or Unix), a network communication module 418, a system initialization module 420, application software 422 and a library 430. The operating system 416 generally includes procedures for handling various basic system services and for performing hardware dependent tasks. The network communication module 418 is used for connecting the system 400 to a file system (FS) 446, servers or other computing devices via one or more communication networks, such as the Internet, other wide area networks, local area networks, metropolitan area networks, and the like. The system initialization module 420 initializes other modules and data structures stored in memory 414 required for the appropriate operation of the system 400. In some embodiments, the application software 422 includes a map operator 424, a reduce operator 426 and a partition operator 428, and the library 430 includes application-independent map functions 432, reduce functions 434, and partition functions 436. As discussed above, the application software 422 may also include a combiner operator 425 when the map-reduce operation meets certain conditions. The functions, procedures or instructions in the library 430 handle the application independent aspects of large scaled data processing jobs, while the application software 422 provides the application-specific functions for producing output data. The application software 422 may include source programs for the map, combiner, reduce and partition operators as well as the corresponding compiled programs, represented by binary files 212 and 312 in FIGS. 2 and 3, respectively.

One or more status tables 444 are also included to track tasks and processes, as described with respect to FIGS. 7A and 7B. In some embodiments, the computer system 400 includes worker processes 438, intermediate files 440, and one or more master process(es) 442. The interaction of worker processes 438 and master processes 442 were described with respect to FIG. 3.

Referring to FIGS. 2, 3 and 4, an application programmer can create a script or program using the application software 422, which includes one or more operators 424, 426 and 428. The script or program is processed into binary files 212, 312 and provided to the work queue master 214, 314.

For the embodiment shown in FIG. 2, input files 202 are split into multiple data blocks and assigned by the work queue master 214 to individual, application independent map and reduce processes 204 and 208. The processes 204 invoke map functions 432 to process the input data (e.g., counting the number of occurrences of a term) to provide intermediate data values. In some embodiments, the input data is structured in the form of key-value pairs. The partition function 436 partitions the map output into one or more intermediate files 440, which are stored on the FS 446. The intermediate data values are processed by the map and reduce processes 204 and 208, which invoke reduce functions 208 for sorting and combining intermediate data values having the same key, and for storing the key and values in one or more output files 210 located on the FS 446. The work queue master 214 manages the map and reduce processes 204 and 208 with the assistance of status tables 444, as described with respect to FIGS. 7A and 7B.

For the embodiment shown in FIG. 3, input files 302 are split into multiple data blocks and assigned by the master process 442 to individual, application independent worker processes 438. The worker processes 438 invoke map functions 432 for operating on blocks of input data (e.g., counting the number of occurrences of a term) to provide intermediate data values. The partition function 436 partitions the map output into one or more intermediate files 440, which are stored locally in memory 412. The intermediate data values are processed by application independent worker processes 438, which invoke reduce functions 434 for sorting and combining intermediate data values having the same key, and for storing the resulting output data in one or more output files 310 located on the file system 446. The master process 442 manages the worker processes 436 with the assistance of status tables 444, as described with respect to FIGS. 7A and 7B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system for large-scale processing of data in a distributed and parallel processing environment including a set of interconnected computing systems, comprising:
    a plurality of interconnected processors;
    an application-independent framework for processing data, including:
        a plurality of application-independent map modules that execute on at least a first subset of the plurality of interconnected processors; and,
        a plurality of application-independent reduce modules, distinct from the plurality of application-independent map modules, that execute on at least a second subset of the plurality of interconnected processors, wherein the application-independent map modules and application-independent reduce modules use application-independent operators to-automatically handle parallelization of computations across the distributed and parallel processing environment when performing user-specified data processing operations;
        wherein the plurality of application-independent map modules and the plurality of application-independent reduce modules are independent of a plurality of user-specified, application-specific operators and operations; and
    the plurality of user-specified, application-specific operators, for use with the application-independent framework, perform the user-specified data processing operations on a user-specified set of input files, the plurality of user-specified, application-specific operators including:
        a map operator that produces intermediate data values, wherein the map operator is applied by the application-independent map modules to input data in the user-specified set of input files to produce the intermediate data values; and
        a reduce operator that produces final output data for at least one of the user-specified data processing operations, wherein the reduce operator is applied by the application-independent reduce modules to process the intermediate data values to produce the final output data for the user-specified data processing operation.

2. The system of claim 1, wherein the application-independent framework for processing data further includes a set of intermediate data structures distributed among a plurality of the interconnected computing systems for storing the intermediate data values.

3. The system of claim 1, wherein:
    the application-independent framework for processing data further includes a set of intermediate data structures for storing the intermediate data values; and
    the plurality of user-specified, application-specific operators further comprise a partition operator, and the partition operator is applied to at least a subset of the intermediate data values to specify, for each respective intermediate data value in the subset of intermediate data values, a respective intermediate data structure of the set of intermediate data structures in which to store the respective intermediate data value.

4. The system of claim 1, wherein:
    the plurality of user-specified, application-specific operators further comprise a combiner operator; and
    the combiner operator is applied by the application-independent map modules in conjunction with the map operator to produce the intermediate data values by combining a plurality of initial data values produced by the application of the map operator to the input data.

5. The system of claim 1, wherein the application independent framework for processing data further includes:
    a plurality of worker processes, each worker process including one of the application-independent map modules and one of the application-independent reduce modules; and
    an application-independent supervisory process for:
        determining, for the user-specified data processing operation, a plurality of data processing tasks including a plurality of map tasks specifying input data to be processed into intermediate data values and a plurality of reduce tasks specifying intermediate data values to be processed into final output data; and
        assigning the data processing tasks to idle ones of the worker processes.

6. The system of claim 5, wherein:
    the number of map tasks exceeds in number the plurality of processes to which the supervisory process can assign map tasks; and
    the application-independent supervisory process maintains status information with respect to map tasks awaiting assignment to a worker process.

7. The system of claim 5, wherein:
    the set of interconnected computer systems are grouped into a plurality of datacenters; and
    when assigning the data processing tasks to idle ones of the worker processes, the supervisory process preferentially assigns data processing tasks for data stored on computer systems in a respective datacenter to worker processes that are running on computer systems in the respective datacenter.

8. The system of claim 1, wherein the application-independent operators include application-independent operators that automatically provide fault tolerance when performing the user-specified data processing operations.

9. The system of claim 1, wherein the application-independent operators include application-independent operators that automatically handle I/O scheduling when performing the user-specified data processing operations.

10. A method of performing large-scale processing of data in a distributed and parallel processing environment comprising:
receiving, from a user, a plurality of user-specified, application-specific operators, for use with an application-independent framework to perform user-specified data processing operations on a user-specified set of input files, the plurality of user-specified, application-specific operators including a map operator and a reduce operator; and
processing data on a set of interconnected computer systems in the application-independent framework, each of the computer systems comprising one or more processors and memory, the application independent framework including:
a plurality of application-independent map modules; and,
a plurality of application-independent reduce modules, distinct from the plurality of application-independent map modules, wherein the application-independent map modules and application-independent reduce modules use application-independent operators to automatically handle parallelization of computations across the distributed and parallel processing environment when performing user-specified data processing operations;
wherein the plurality of application-independent map modules and the plurality of application-independent reduce modules are independent of a plurality of user-specified, application-specific operators and operations;
the data processing including:
producing intermediate data values by using the application-independent map modules to apply the map operator to input data in the user-specified set of input files; and
producing output data for at least one of the user-specified data processing operations by using the application-independent reduce modules to apply the reduce operator to process the intermediate data values.

11. The method of claim 10, wherein processing data on the set of interconnected computer systems in the application-independent framework includes storing the intermediate data values in a set of intermediate data structures distributed among a plurality of the interconnected computing systems.

12. The method of claim 10, wherein processing data on the set of interconnected computer systems in the application-independent framework includes storing the intermediate data values in a set of intermediate data structures;
wherein the plurality of user-specified, application-specific operators further include a partition operator; and
the method further includes applying the partition operator to at least a subset of the intermediate data values to specify, for each respective intermediate data value in the subset of intermediate data values, a respective intermediate data structure of the set of intermediate data structures in which to store the respective intermediate data value.

13. The method of claim 10, wherein the plurality of user-specified, application-specific operators further include a combiner operator; and
the method further includes applying the combiner operator in conjunction with the map operator to produce the intermediate data values by combining a plurality of initial data values produced by the application of the map operator to the input data.

14. The method of claim 10, wherein the application independent framework for processing data further includes a plurality of worker processes, each worker process including one of the application-independent map modules and one of the application-independent reduce modules, and an application-independent supervisory process; and
the data processing further includes:
determining, via the application-independent supervisory process, a plurality of data processing tasks including a plurality of map tasks specifying input data to be processed into intermediate data values and a plurality of reduce tasks specifying intermediate data values to be processed into final output data; and
assigning, via the application-independent supervisory process, the data processing tasks to idle ones of the worker processes.

15. The method of claim 14, wherein:
the number of map tasks exceeds in number the plurality of processes to which the supervisory process can assign map tasks; and
the data processing further includes maintaining, via the application-independent supervisory process, status information with respect to map tasks awaiting assignment to a worker process.

16. The method of claim 14, wherein the set of interconnected computer systems are grouped into a plurality of datacenters; and
assigning the data processing tasks to idle ones of the worker processes includes preferentially assigning, via the application-independent supervisory process, data processing tasks for data stored on computer systems in a respective datacenter to worker processes that are running on computer systems in the respective datacenter.

17. The method of claim 10, including automatically providing fault tolerance, via the application-independent operators, when performing the user-specified data processing operations.

18. The method of claim 10, including automatically handling I/O scheduling, via the application-independent operators, when performing the user-specified data processing operations.

19. A non-transitory computer-readable storage medium storing one or more programs configured for execution by a plurality of processors of a set of interconnected computer systems, the one or more programs comprising instructions to be executed by one or more of the plurality of processors so as to:
receive, from a user, a plurality of user-specified, application-specific operators, for use with an application-independent framework to perform user-specified data processing operations on a user-specified set of input files, the plurality of user-specified application-specific operators including a map operator and a reduce operator; and
process data on a set of interconnected computer systems in the application-independent framework, each of the computer systems comprising one or more processors and memory, the application independent framework including:
- a plurality of application-independent map modules; and,
- a plurality of application-independent reduce modules, distinct from the plurality of application-independent map modules, wherein the application-independent map modules and application-independent reduce modules use application-independent operators to automatically handle parallelization of computations across the distributed and parallel processing environment when performing user-specified data processing operations;

wherein:
- the plurality of application-independent map modules and the plurality of application-independent reduce modules are independent of a plurality of user-specified, application-specific operators and operations;
- the application-independent map modules include instructions to be executed by one or more of the plurality of processors so as to produce intermediate data values by applying the map operator to input data in the user-specified set of input files; and
- the application-independent reduce modules include instructions to be executed by one or more of the plurality of processors so as to produce output data for at least one of the user-specified data processing operations by applying the reduce operator to process the intermediate data values.

20. The non-transitory computer-readable storage medium of claim 19, wherein processing data on the set of interconnected computer systems in the application-independent framework includes storing the intermediate data values in a set of intermediate data structures distributed among a plurality of the interconnected computing systems.

21. The non-transitory computer-readable storage medium of claim 19, wherein processing data on the set of interconnected computer systems in the application-independent framework includes storing the intermediate data values in a set of intermediate data structures;
wherein the plurality of user-specified, application-specific operators further comprise a partition operator; and
the one or more programs further comprise instructions to apply the partition operator to at least a subset of the intermediate data values to specify, for each respective intermediate data value in the subset of intermediate data values, a respective intermediate data structure of the set of intermediate data structures in which to store the respective intermediate data value.

22. The non-transitory computer-readable storage medium of claim 19, wherein the plurality of user-specified, application-specific operators further comprise a combiner operator; and the one or more programs further comprise instructions to apply the combiner operator in conjunction with the map operator to produce the intermediate data values by combining a plurality of initial data values produced by the application of the map operator to the input data.

23. The non-transitory computer-readable storage medium of claim 19, wherein the application independent framework for processing data further includes a plurality of worker processes, each worker process including one of the application-independent map modules and one of the application-independent reduce modules, and an application-independent supervisory process; and
the one or more programs further comprise instructions to:
- determine, via the application-independent supervisory process, a plurality of data processing tasks including a plurality of map tasks specifying input data to be processed into intermediate data values and a plurality of reduce tasks specifying intermediate data values to be processed into final output data; and
- assign, via the application-independent supervisory process, the data processing tasks to idle ones of the worker processes.

24. The non-transitory computer-readable storage medium of claim 23, wherein:
the number of map tasks exceeds in number the plurality of processes to which the supervisory process can assign map tasks; and
the one or more programs further comprise instructions to maintain, via the application-independent supervisory process, status information with respect to map tasks awaiting assignment to a worker process.

25. The non-transitory computer-readable storage medium of claim 23, wherein the set of interconnected computer systems are grouped into a plurality of datacenters; and
assigning the data processing tasks to idle ones of the worker processes includes preferentially assigning, via the application-independent supervisory process, data processing tasks for data stored on computer systems in a respective datacenter to worker processes that are running on computer systems in the respective datacenter.

26. The non-transitory computer-readable storage medium of claim 19, the one or more programs further comprise instructions to automatically provide fault tolerance, via the application-independent operators, when performing the user-specified data processing operations.

27. The non-transitory computer-readable storage medium of claim 19, the one or more programs further comprise instructions to automatically handle I/O scheduling, via the application-independent operators, when performing the user-specified data processing operations.

* * * * *